United States Patent [19]
Duret

[11] Patent Number: 5,839,887
[45] Date of Patent: Nov. 24, 1998

[54] INTERNAL-COMBUSTION ENGINE HAVING A SPECIFIC-PURPOSE PRESSURE STORAGE TANK

[75] Inventor: Pierre Duret, Sartrouville, France

[73] Assignee: Institut Francais du Petrole, Rueil-Malmaison, France

[21] Appl. No.: 499,507

[22] Filed: Jul. 7, 1995

[30] Foreign Application Priority Data

Jul. 8, 1994 [FR] France ................... 94-08602

[51] Int. Cl.⁶ .................................. F04B 17/05
[52] U.S. Cl. ............................. 417/364; 91/47
[58] Field of Search ............. 123/65 R, 73 R, 123/74 R, 74 AE, 317, 318, 532, 534; 417/255, 364; 91/47; 92/80, 82

[56] References Cited

U.S. PATENT DOCUMENTS

| | | | |
|---|---|---|---|
| 1,096,900 | 5/1914 | Fornaca | 123/65 R |
| 1,334,963 | 3/1920 | Ohlsson | 417/364 |
| 1,933,002 | 10/1933 | Beyer | 123/73 R |
| 3,101,888 | 8/1963 | Abramopaulos | 417/364 |
| 3,195,471 | 7/1965 | Ghandhi | 417/364 |
| 3,672,172 | 6/1972 | Hammond | 123/317 |
| 4,944,277 | 7/1990 | Olson | 123/532 |

FOREIGN PATENT DOCUMENTS

| | | |
|---|---|---|
| 0189716 | 8/1986 | European Pat. Off. . |
| 2662214 | 11/1991 | France . |
| 1576763 | 3/1970 | Germany ............ 123/73 R |
| 41 29 574 | 12/1992 | Germany . |
| 3-26865 | 2/1991 | Japan ................... 417/364 |

OTHER PUBLICATIONS

Patent Abstracts of Japan, vol. 8, No. 43 (M–279) Feb. 24, 1984.

Primary Examiner—Michael Koczo
Attorney, Agent, or Firm—Antonelli, Terry, Stout & Kraus, LLP

[57] ABSTRACT

The present invention relates to an internal-combustion engine having at least one piston sliding in a cylinder, at least one combustion chamber (4) and a compressed air or gas storage tank (14) connected to a volume compressed by the motion of said piston via a connection means provided with a nonreturn device (16) allowing a gas at a pressure greater than or equal to that of the compressed volume to be stored in said tank (14). According to the invention, the gas under pressure present in said tank (14) fulfills a purpose other than that related to the feeding of the combustion chamber (4).

5 Claims, 2 Drawing Sheets

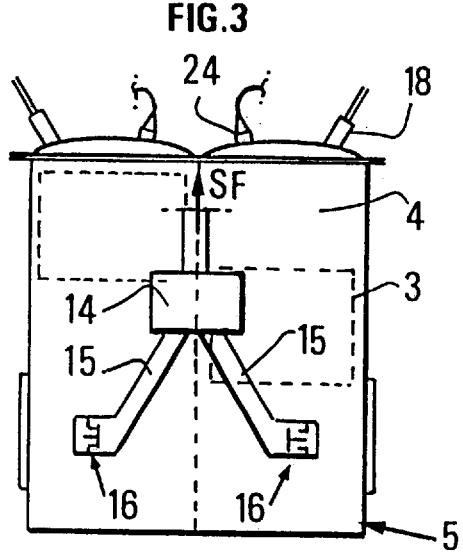

INTERNAL-COMBUSTION ENGINE HAVING A SPECIFIC-PURPOSE PRESSURE STORAGE TANK

FIELD OF THE INVENTION

The present invention relates to the field of single-cylinder or multi-cylinder internal-combustion engines.

The engines concerned notably include conventionally at least one cylinder defining a combustion chamber with a piston. Fuel injection may be achieved directly in the combustion chamber or not.

BACKGROUND OF THE INVENTION

It is well-known to connect the pump crankcase, which contains gases under pressure, to a tank (or capacity) referred to as a pressure storage tank.

According to document FR-2,575,523, this tank is connected to a fuel injection means in order to achieve a pneumatic injection of fuel into the combustion chamber.

French patent application Serial No. 93/06,785, now FR-2,706,181 also describes a capacity under pressure intended for reinforcing the tightness at the level of the valve rods, said capacity being connected to the inlet pipe.

This well-known prior art thus discloses capacities under pressure which allow different purposes directly related to the feeding of the combustion chamber to be fulfilled.

Furthermore, the braking systems commonly used in current motor vehicles are hydraulic and operated by the force exerted by the driver on the brake pedal. This force can be significantly amplified by the presence of a servobrake. In a servobrake, an underpressure is used to amplify the force developed on the pedal.

According to the type of engine used, the underpressure has different origins:

for four-cycle spark-ignition engines, under braking conditions, i.e. with the foot off the accelerator pedal, the engine feed is cut off by the throttle. The result of this is an underpressure in the inlet manifold downstream from the throttle. This underpressure is communicated with the servobrake and used as an amplifier. The underpressure is in the range of 400 to 700 mbar according to the engine conditions at the time of the braking concerning the diesel engines used in motor vehicles, these engines work at low load and therefore under braking conditions (foot off the accelerator pedal) with high air flow rates and thus very slight underpressures in the inlet manifold. The underpressure at the level of the manifold thus cannot be used for the servobrake. It is therefore necessary to add a specific vacuum pump for this braking aid function (underpressure of 500 to 900 mbar). This vacuum pump thus constitutes an additional element of the vehicle, which leads to cost, space and power consumption problems if an electric pump is necessary, and belt drive problems in case of a mechanical drive.

The two-cycle engines which have been used in motor vehicles in the past (1950s–1960s) drove vehicles without any braking aid system.

The two-cycle engine is currently under development again for automobile applications. It appears that with two-cycle engines provided with pump crankcases notably, the intake underpressure remains low even when the foot is off the accelerator pedal, i.e. when the throttle is closed. It is then only about 100 to 150 mbar. In this sense, the current two-cycle engine is close to the diesel engine because this intake underpressure is not sufficient to be used as a braking aid.

An additional and specific vacuum pump is therefore generally used in two-cycle automobile engines under development to fulfil this braking aid underpressure purpose. Such automobile two-cycle engines, which require this additional equipment, thus present all the drawbacks cited above in connection with four-cycle diesel engines.

SUMMARY OF THE INVENTION

The present invention allows notably to overcome these problems since it avoids the presence of a vacuum pump or of an additional compressor for fulfilling notably the braking aid function.

The present invention relates to an internal-combustion engine having at least one piston sliding in a cylinder, at least one combustion chamber and a compressed air or gas storage tank connected to at least one volume compressed by the motion of said piston via a connection means provided with a nonreturn device allowing a gas at a pressure greater than or equal to that of the compressed volume to be stored in said tank.

Said volume can consist of a pump crankcase or of said combustion chamber.

According to the invention, the gas under pressure present in said tank fulfills a purpose other than that related to the feeding of the combustion chamber.

Preferably, the engine according to the invention also includes a means for combining an intake underpressure with the pressure in said tank.

Advantageously, said gas under pressure in said tank is used to fulfil a braking aid function in a servobrake SF.

Alternately, the gas under pressure in said tank can be used to perform an injection of said gas in an exhaust pipe of the engine.

The gas under pressure present in the tank can also be used to perform a pneumatic injection of fuel in a combustion chamber.

Furthermore, the engine includes a means intended for decreasing the amount of lubricant likely to be carried by said connection means.

Without departing from the scope of the invention, the engine according to the invention further includes a means intended for increasing the maximum pressure prevailing in said pump crankcase at certain times of the working cycle.

The engine according to the invention can also include a device for detecting a pressure variation in said tank, co-operating with a device for adjusting the fuel injection in the combustion chamber so as to control continuously the air/fuel ratio of the mixture injected in the combustion chamber.

The engines in which the invention can be preferably implemented are mainly direct injection engines, two-cycle engines with pump crankcases and multi-cylinder engines comprising several connection means each linking a pump crankcase to the storage tank, and each provided with a nonreturn device.

BRIEF DESCRIPTION OF THE DRAWINGS

Other features and advantages of the invention will be clear from reading the description hereafter, given by way of non limitative examples, with reference to the accompanying drawings in which:

FIG. 3 is a simplified cross-section of a servobrake used according to the invention in another working position.

DESCRIPTION OF THE PREFERRED EMBODIMENTS

Figure 1:
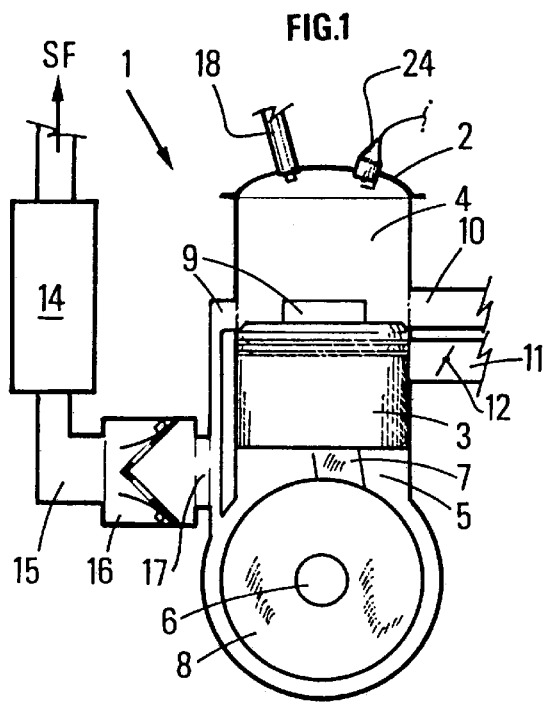
FIG. 1 is a simplified schematic cross-section of an engine according to an embodiment of the invention.

FIG. 1 relates more precisely to a two-cycle engine provided with a pump crankcase whose cylinder 1 is closed, in its upper part, by a cylinder head 2. A piston 3 moves inside the cylinder and defines a combustion chamber 4 between its upper surface and the lower surface of cylinder head 2.

A pump crankcase 5 forms a continuation of the chamber 4 of the cylinder, below piston 3. The pump crankcase 5 is crossed by the crankshaft 6 of the engine, in a perpendicular direction to the axis of the cylinder. Crankshaft 6, integral with an inertia flywheel 8, is connected to piston 3 by means of a connecting rod 7.

The wall of cylinder 1 is crossed by transfer ports 9 communicating with the inner volume of the pump crankcase 5 and opening into combustion chamber 4.

The wall of the cylinder is also crossed, at the level of combustion chamber 4, by exhaust ports 10 allowing discharge of the gases burned in the combustion chamber 4. Ports 9 and 10, which are located in the part of the cylinder scavenged by piston 3, are likely to be concealed by the piston during certain working phases of the engine.

An air supply pipe 11 in which a valve 12 can be placed opens into the upper part of the pump crankcase, in an area forming a continuation of the combustion chamber 4.

Piston 3 allows atmospheric air to be sucked in through pipe 11, valve 12 being open, during its displacement between its bottom dead center and its top dead center.

The air introduced into the pump crankcase 5 is compressed by piston 3 during its displacement between its top dead center and its bottom dead center.

Part of the air introduced into pump crankcase 5 and compressed by piston 3 is fed into combustion chamber 4 through transfer ports 9, the gases burned in combustion chamber 4 being discharged through exhaust ports 10.

The engine comprises a compressed air tank 14 communicating with the inner volume of pump crankcase 5, by means of a pipe 15 on which a valve 16 fastened to the pump crankcase is placed, at the level of a port 17 crossing its wall.

Part of the air compressed in pump crankcase 5 during the displacement of piston 3 towards its bottom dead center is sent into tank 14, the opening of valve 16 being ensured by the pressure of the air inside crankcase 5.

In other words, valve 16 opens when the pressure inside pump crankcase 5 is greater than the pressure in tank 14.

When the pressure in the pump crankcase 5 falls below a given value, when the transfer ports 9 are open during the downstroke of the piston, valve 16 closes again, so that the tank 14 containing a compressed air reserve is insulated from the pump crankcase.

The gas contained in crankcase 5 is thus compressed through the downstroke of the piston and its pressure increases. When the pressure in tank 14 becomes lower than the maximum pressure reached in crankcase 5, tank 14 is supplied with compressed air by the crankcase. The pressure in tank 14 is thus equal or close to the maximum pressure reached in the pump crankcase. This maximum pressure can be (generally) 300 to 700 mbar above the atmospheric pressure. This value depends on several parameters, among which the compression ratio of the pump crankcase and the running conditions of the engine.

In the engine according to the invention, the compressed air tank 14 can be used for feeding a servobrake system inversely to what is conventionally achieved, the compressed air being used, according to the invention, to amplify the braking effect due to the driver's action on the pedal.

In other words, according to a particular embodiment, the present invention thus allows, in a two-cycle or a four-cycle engine provided with a pump crankcase, to draw off part of the air compressed by the pump crankcase in a storage tank 14 for storing air under pressure at a pressure about 400 to 600 mbar above the atmospheric pressure, and to use this positive pressure as a braking aid by operating a servobrake, not with a differential pressure between the atmosphere and an underpressure, but with a differential pressure between the positive pressure stored and the atmopshere and/or an intake underpressure.

Without departing from the scope of the invention, the compressed air tank 14 may be used as an aid for other purposes where the underpressure generated at the intake (or by a vacuum pump) is used, and for purposes where a compressed air load is necessary.

For example, the device according to the invention can allow air injection at the engine exhaust (well-known technique for promoting a catalyst faster during the starting phase of the engine) without requiring a specific air pump for this purpose.

The compressed air can be advantageously used to help to spray lubricant and thus to feed a pneumatic injection system for injecting lubricant at the engine intake, or in the pump crankcase of the engine or directly on the crankshaft, connecting rod or piston pin bearings.

The compressed air can also be advantageously used to feed a pneumatic fuel injection system.

Besides, engine aerodynamic control devices (control through closing of the transfer and/or exhaust pipes) can also have an additional effect by increasing the pressure of the compressed air stored.

In the instance of the use of compressed air for braking aid, the dimensioning of tank 14 will be selected so as to meet the braking requirements, for example, so as to allow two or three successive brakings without losing the aid effect.

The same applies to the other uses of this compressed air.

The principle according to the invention applies more particularly to two-cycle engines provided with a pump crankcase and a separate introduction of fuel directly into the cylinder or the combustion chamber. In fact, in this case, the pump crankcase contains only air and possibly very low amounts of lubricant whereas in the case of a two-cycle engine provided with a carburetor in the intake, the pump crankcase would contain air and fuel. This air/fuel mixture would be difficult to use as a source of compressed gas without pollution by the fuel during the discharge of the compressed gas in the atmosphere (during braking for example).

Similarly, in order to prevent the very low amount of lubricant which might be present in the pump crankcase from passing into tank 14, it is possible either to choose judiciously the position of connection 17 in the pump crankcase 5 so as to prevent lubricant carry over, or to provide an oil trapping system: for example baffles associated with draining so as to recycle the oil towards the pump crankcase 5, or to provide a device for recycling the lubricant accumulated in a lower part of tank 14 towards the pump crankcase, by using the pressure in tank 14 as disclosed in French patent application Serial No. 93/06,784.

In the case of a multi-cylinder two-cycle engine, a single compressed air tank 14 may be more relevant than one tank per cylinder. In this case, the tank 14 common to the different cylinders can have a connection 15 and a nonreturn system 16 with each of the pump crankcases 5.

If one wishes to further improve the braking aid effect, it is possible to combine to the positive pressure effect obtained according to the invention an intake underpressure effect on the other side of the servobrake system. In fact, the intake underpressure of a two-cycle engine, which is of the order of 100–150 mbar, is too low to be used alone but it can be added to the pressure effect obtained according to the invention (400 to 700 mbar) to obtain a greater pressure difference (500 to 850 mbar) by combining both effects.

Figure 2A:
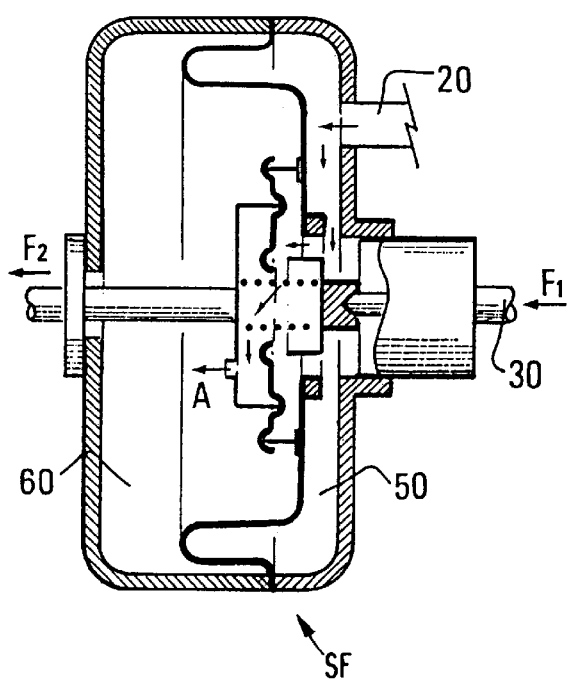
FIGS. 2A–2B is a simplified cross-section of a servobrake used according to the invention in a working position.
Figure 2B:
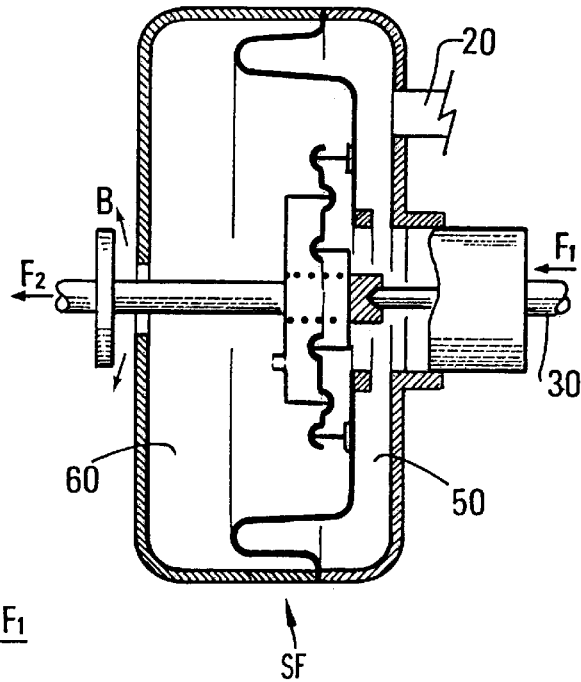

FIGS. 2A and 2B show in a more detailed way this implementation of the invention in a servobrake SF intended, as it is well-known, for amplifying the force F1 applied on the brake pedal into a force F2 applied to the master cylinder.

FIG. 2A shows the servobrake when the brake pedal is not actuated, whereas FIG. 2B shows the servobrake SF in braking position.

According to the invention, a pipe 20 connects the tank 14 under pressure to one zone 50 of the two zones 50–60 of the servobrake SF.

Conventionally, the servobrake SF includes a second zone 60 co-operating with a means (not shown) acting upon the master cylinder of the braking system.

Zone 50 co-operates with a means 30 connected to the brake pedal.

In the instance of FIG. 2A, i.e. when the driver of the vehicle exerts no force on the brake pedal, the pressures P in zones 50 and 60 are substantially equal to the maximum pressure in the pump crankcase, i.e. that of the tank 14 under pressure by means of a link shown by arrows A.

When the brake pedal is actuated (FIG. 2B), a force F1 is exerted in the direction shown by the arrow on means 30, and zone 50 remains at the pressure P while zone 60 is brought to a pressure either equal to the atmospheric pressure, or equal to the intake underpressure via the link shown by arrows B. In other words, link A is cut off while a link B is established.

Zone 50 is thus at a pressure P~1400 to 1700 mbar, a pressure that is higher than that of zone 60 which is at most equal to the atmospheric pressure.

Specifically, when the present invention fulfils a function dedicated to braking, during one or several successive brakings, compressed air from tank 14 will be consumed, leading to an automatic draw off of compressed air provided by the pump crankcase 5. This may result in a pressure decrease of the compressed air passing into the cylinder (via the transfer pipes) and therefore in a temporary enrichment of the mixture confined in the combustion chamber, during one or several combustion cycles.

In order to avoid this enrichment phenomenon, a correction of the amount of fuel injected can be provided in proportion to this decrease in the air admitted in the cylinder. This can be easily achieved by an electronic engine management system. For example with a pressure detector in tank 14, it is possible to identify the running cycles where tank 14 is in the filling phase, and thus to correct the amount of fuel injected accordingly.

Finally, a particularly advantageous solution provided by the device according to the invention consists in using the compressed air supplied by the pump crankcase for several purposes, i.e. for example to combine the use as a braking aid with a use as a source of compressed air for feeding a pneumatic injection device for injecting fuel into the combustion chamber.

Additional devices in the engine, such as the closing of the exhaust at partial load, or the closing of the transfers, have a very favourable effect according to the invention because they generally increase the pump crankcase pressure peak at partial load, and therefore the pressure level which might be stored in tank 14.

The invention is of course applicable to four-cycle engines with pump crankcases and is not limited to two-cycle engines, although it is of greater significance a priori for two-cycle engines.

I claim:

1. An internal-combustion engine having at least one piston sliding in a cylinder, at least one combustion chamber, an engine crankcase, a compressed air or gas storage tank connected to a volume in the engine crankcase compressed by the motion of said piston via a connection means provided with a nonreturn device allowing a gas at a pressure at most equal to that of the engine crankcase to be stored in said tank, a passage connecting said tank to a further device, said passage not being connected, downstream of said tank, to a combustion chamber, whereby the gas under pressure fulfills a purpose other then that related to the feeding of a combustion chamber, and a means for amplifying a force by using a differential pressure between an atmospheric pressure or underpressure and the pressure in said tank.

2. An engine as claimed in claim 1, comprising a direct injection of fuel into said combustion chamber.

3. An engine as claimed in claim 1, characterized in that it consists of a two-cycle engine.

4. An engine as claimed in claim 1, characterized in that it comprises several cylinders, several connection means linking each a pump crankcase to said storage tank and each provided with a nonreturn device.

5. An internal-combustion engine, comprising at least one piston sliding in a cylinder, at least one combustion chamber, a compressed air or gas storage tank connected to a volume compressed by the motion of said piston via a connection means provided with a nonreturn device allowing a gas at a pressure at most equal to that of the compressed volume to be stored in said tank, a passage connecting said tank to a further device, said passage not being connected, downstream of said tank, to a combustion chamber, and a means for amplifying a force by using a differential pressure between an atmospheric pressure or underpressure and the pressure in said tank.

* * * * *